(12) United States Patent
Suzuki et al.

(10) Patent No.: US 7,536,972 B2
(45) Date of Patent: May 26, 2009

(54) SHIFT LEVER APPARATUS WITH RANGE POSITION INDICATOR

(75) Inventors: Takayoshi Suzuki, Shizuoka (JP); Tomohiro Takahira, Shizuoka (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 311 days.

(21) Appl. No.: 11/511,222

(22) Filed: Aug. 29, 2006

(65) Prior Publication Data
US 2007/0074597 A1   Apr. 5, 2007

(30) Foreign Application Priority Data
Aug. 30, 2005   (JP) ............................. 2005-248525

(51) Int. Cl.
*F16H 63/42* (2006.01)
*B60K 20/04* (2006.01)
(52) U.S. Cl. .................................. 116/28.1; 74/473.18
(58) Field of Classification Search ............... 116/28.1, 116/35 A; 74/523, 526, 473.18, 473.3, 471 XY
See application file for complete search history.

(56) References Cited

U.S. PATENT DOCUMENTS 5,862,708 A * 1/1999 Shamoto .................. 74/473.18
7,201,077 B2 * 4/2007 Yamamoto et al. ....... 74/473.18
2004/0237693 A1 * 12/2004 Koide ...................... 74/473.18
2005/0000310 A1   1/2005 Yamamoto et al.

FOREIGN PATENT DOCUMENTS

| JP | 11-078581 A | 3/1999 |
| JP | 11-123949 A | 5/1999 |
| JP | 2002029277 A * | 1/2002 |
| JP | 2005-001401 A | 1/2005 |

* cited by examiner

*Primary Examiner*—R. A. Smith
(74) *Attorney, Agent, or Firm*—Foley & Lardner LLP

(57) ABSTRACT

Shift lever apparatus includes: a shift lever adapted to be shifted in a longitudinal direction to select one of ranges in an automatic mode and to be inclined in a lateral direction to select a range in a manual mode; a frame member; a longitudinal slide plate slidable in the frame member in the longitudinal direction together with the shift lever; and a lateral slide plate slidable in the lateral direction relative to the longitudinal slide plate in accordance with a shift operation of the shift lever. The lateral slide plate includes a current shift position indicator to indicate a current shift position of the shift lever. The lateral slide plate further includes a buffer portion to mitigate impact at an end of a stroke of the lateral slide plate in the lateral direction.

10 Claims, 5 Drawing Sheets

SHIFT LEVER APPARATUS WITH RANGE POSITION INDICATOR

BACKGROUND OF THE INVENTION

The present invention relates to shift lever apparatus with a range position indicator, and more specifically to a shift lever apparatus for preventing collision noises in shifting operation in a lateral direction.

A shift lever range position indicating system is employed widely in motor vehicles, to indicate the range in which an automatic transmission is set. In automatic transmissions of some types, there is further provided a manual mode in addition to the ranges of the automatic mode, and hence, the shift lever range position indicating system is arranged to indicate the manual mode.

A United States Patent Application Publication Pub. No. US 2005/0000310A1 (corresponding to Japanese published Patent Application Pub. No. 2005-1401) discloses an automatic transmission shift range indicating mechanism of earlier technology. This shift range indicating mechanism includes an indicator base, a first slide plate which is formed with an opening receiving the shift lever and which is slidable in the indicator base in a longitudinal direction of a vehicle body together with a shift lever extending through the opening of the first slide plate, and a second slide plate which is formed with an opening receiving the shift lever and which is slidable in the first slide plate in a lateral direction from a D range to a manual range when the shift lever is inclined to the right.

SUMMARY OF THE INVENTION

However, in the manual range of the above-mentioned shift range indicating mechanism, the shift lever is shifted in the longitudinal direction independently of the first and second slide plates so that a clearance between the shift lever and the openings of the first and second slide plates is increased. Therefore, when the shift lever is inclined to the left or right to change the transmission mode between the D range and manual mode, the second plate moves laterally by being pushed by the shift lever, and bumps against the indicator base with collision noises so that the shift feeling is not satisfactory.

It is therefore an object of the present invention to provide a shift lever apparatus to improve the shift feeling.

According to one aspect of the invention, a shift lever apparatus comprises: a shift lever adapted to be shifted in a longitudinal direction to select one of ranges in an automatic mode and to be inclined in a lateral direction to select a range in a manual mode; a frame member including a guide groove, and a set of range indicating portions indicating positions of the ranges along the guide groove; a longitudinal slide plate mounted on the frame member and arranged to slide in the longitudinal direction together with the shift lever; and a lateral slide plate mounted on the longitudinal slide plate and arranged to slide in the lateral direction relative to the longitudinal slide plate in accordance with a shift operation of the shift lever. The lateral slide plate includes a current shift position indicator arranged to slide in the guide groove of the frame member and to indicate a current shift position of the shift lever, and a buffer portion to mitigate impact at an end of a stroke of the lateral slide plate in the lateral direction.

DETAILED DESCRIPTION OF THE INVENTION

FIGS. 1~4 show a shift lever apparatus including a range position indicating mechanism according to a first embodiment of the present invention. In the first embodiment, there is provided at least one buffer portion on either or both of the left and right sides of a current position indicator or current position indicating section.

Figure 1:
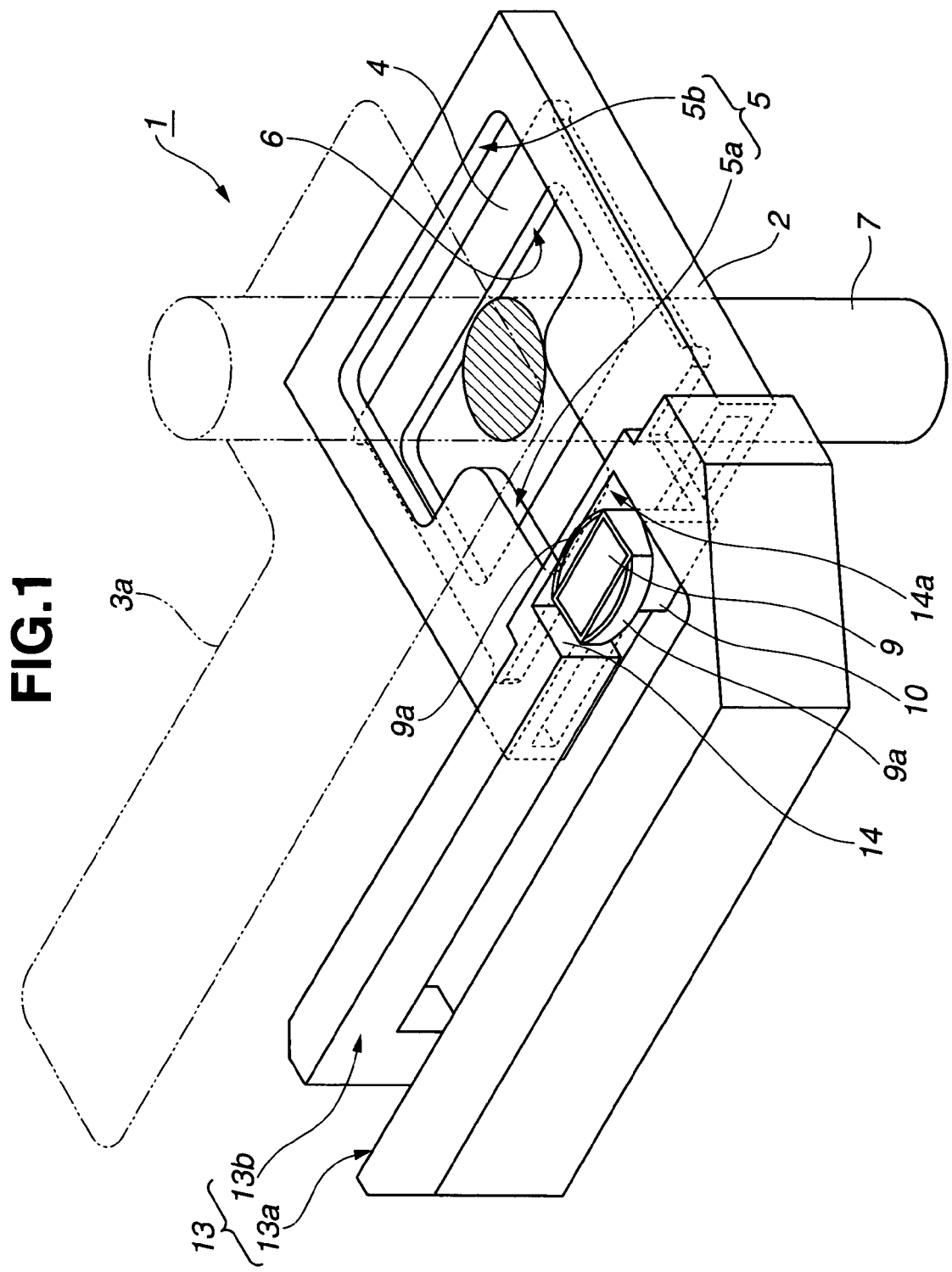
FIG. 1 is a perspective view showing a main part of a shift lever apparatus according to a first embodiment of the present invention.
Figure 3:
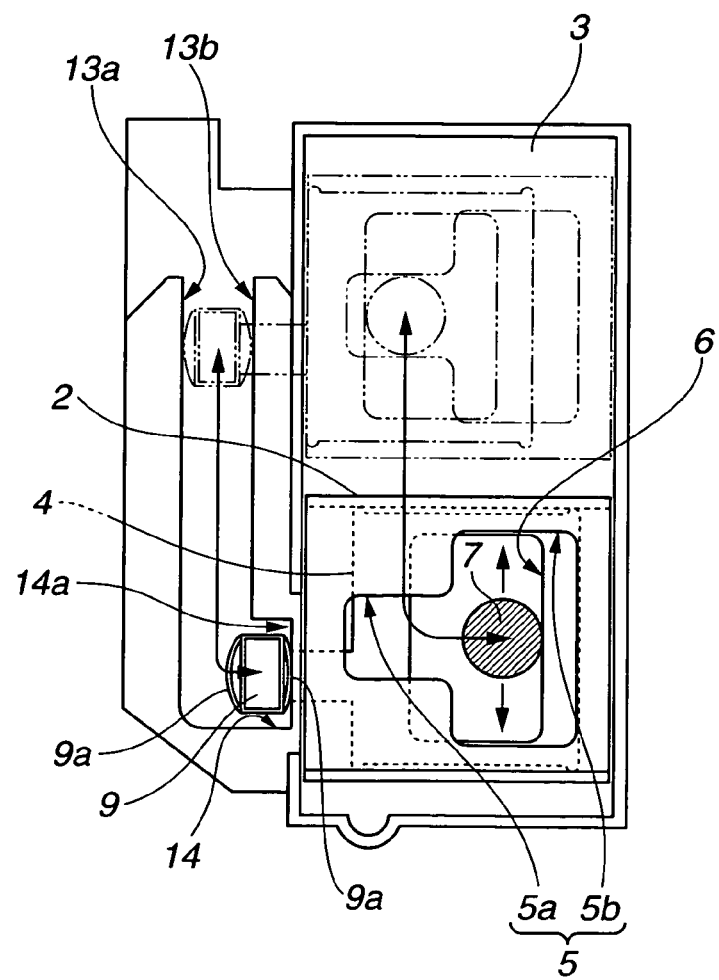
FIG. 3 is a view for illustrating operation of the shift lever apparatus shown in FIG. 1.
Figure 4:
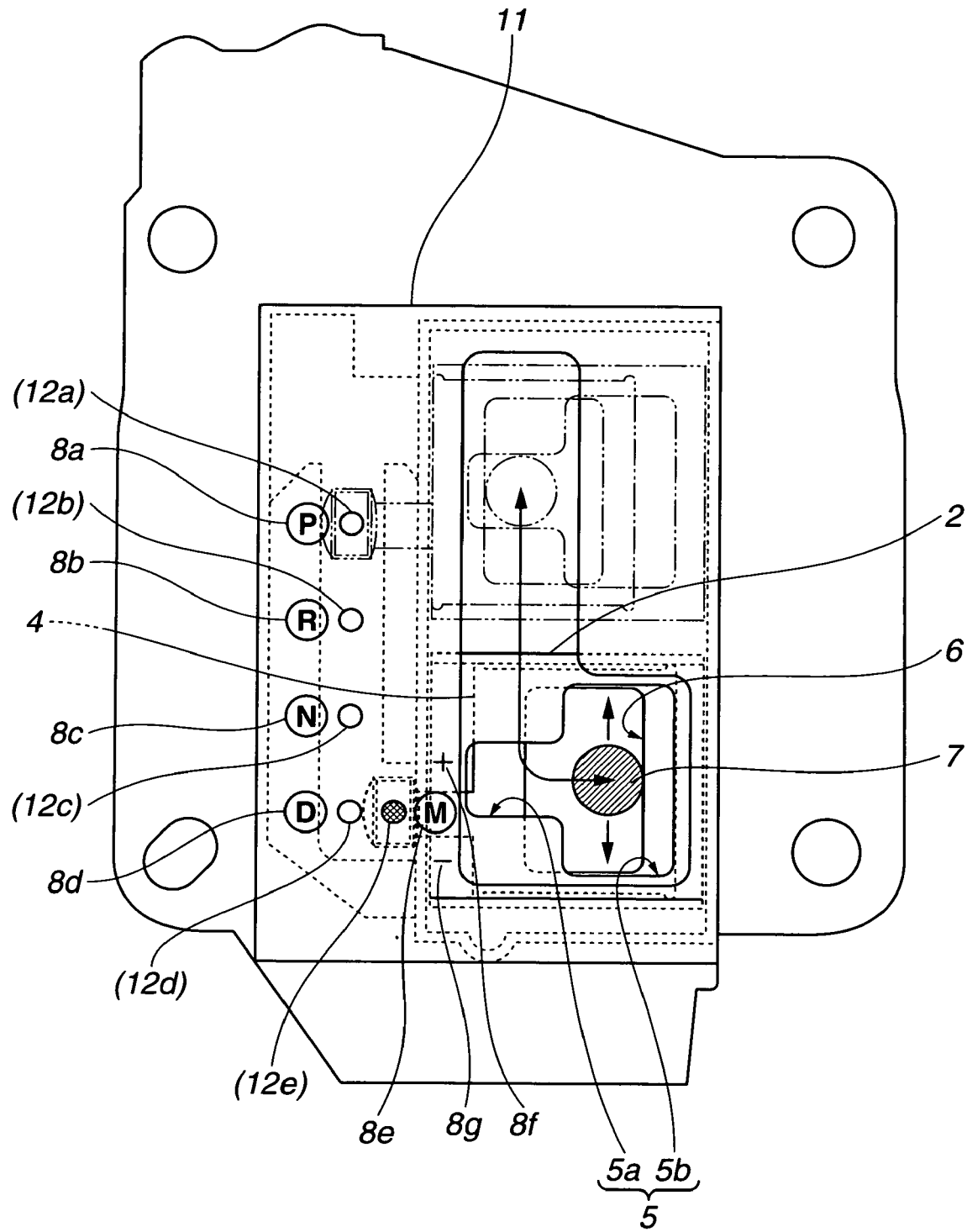
FIG. 4 is a plan view of the shift lever apparatus of FIG. 1.

FIG. 1 shows a main part of the shift lever apparatus 1, and FIG. 4 is a plan view of the shift lever apparatus 1 shown in FIG. 1. As shown in FIG. 3, the shift lever apparatus includes a frame member 3 which is formed with a pair of inside guide grooves on the left and right sides inside the frame member 3. A first slide plate or longitudinal slide plate 2 is slidable along the inside guide grooves of frame member 3 in a first direction or a longitudinal direction of the shift lever apparatus (from the upper left to the lower right as viewed in FIG. 1). In this example, the first or longitudinal direction of the shift lever apparatus extends in a longitudinal (front and rear) direction of a vehicle body when installed in a vehicle. A second slide plate or lateral slide plate 4 is mounted in the longitudinal slide plate 2, and arranged to slide, relative to the longitudinal slide plate 2, in a second or lateral direction which, in this example, extends in a lateral (left and right) direction of the vehicle body.

As shown in FIG. 1, the longitudinal slide plate 2 is formed with a first opening 5 including an automatic operation region 5a and a manual operation region 5b. The lateral slide plate 4 is formed with a second opening 6 including only a manual operation region. A shift lever 7 is inserted through the first and second openings 5 and 6. A driver can select one of a plurality of ranges in an automatic mode arranged in the longitudinal direction by shifting the shift lever 7 in the state in which the shift lever 7 is put in the automatic operation region 5a. The driver can select a range in a manual mode by inclining the shift lever to one lateral side (the right side in this example) from a predetermined range of the automatic mode, and thereby shifting the shift lever 7 into the manual operation region 5b of longitudinal slide plate 2. The range of the manual mode is located at the side of the row of the ranges of the automatic mode. As shown in FIG. 1, the frame member 3 is formed with an opening 3a defining a range of movement of shift lever 7 inserted through the longitudinal slide plate 2 and lateral slide plate 4.

When the shift lever 7 is moved, in the automatic mode, in the longitudinal direction, both of the longitudinal slide plate 2 and lateral slide plate 4 slide relative to the frame member 3. When the shift lever 7 is moved in the lateral direction in the D range, the shift lever 7 moves from the automatic operation region 5a into the manual operation region 5b of longitudinal slide plate 2, and only the lateral slide plate 4 slides relative to the longitudinal slide plate 2 in the lateral direction.

The lateral slide plate 4 includes a current position indicator or indicating section 9, and the frame member 3 is formed with a longitudinal (indicator) guide groove 13. Longitudinal guide groove 13 is formed along the ranges of the automatic mode, and arranged to guide movement of the current position indicator 9 along a path corresponding to a path of shift lever 7. Longitudinal guide groove 13 extends in the longitudinal direction to guide longitudinal movement of the current position indicator 9 of lateral slide plate 4. Longitudinal guide groove 13 is formed between first and second guide walls 13a and 13b of the frame member 3. When shift lever 7 is shifted along the ranges of the automatic mode, the current position indicator 9 is guided along the longitudinal guide groove 13. The frame member 3 is further formed with a lateral guide recess 14 adapted to receive the current position indicator 9 when the shift lever 7 is inclined to the range of the manual mode. The lateral guide recess 14 extends from longitudinal guide groove 13 to a guide wall (or bottom) 14a on which the current position indicator 9 can abut. In this example, the lateral guide recess 14 extends rightward as viewed in FIG. 3, toward the position of the shift lever 7, continuously from the portion of the longitudinal guide groove 13 corresponding to the D range. Therefore, the lateral guide recess 14 is located, in the lateral direction, between the position of the longitudinal guide groove 13 and the position of the longitudinal slide plate 2.

Figure 2:
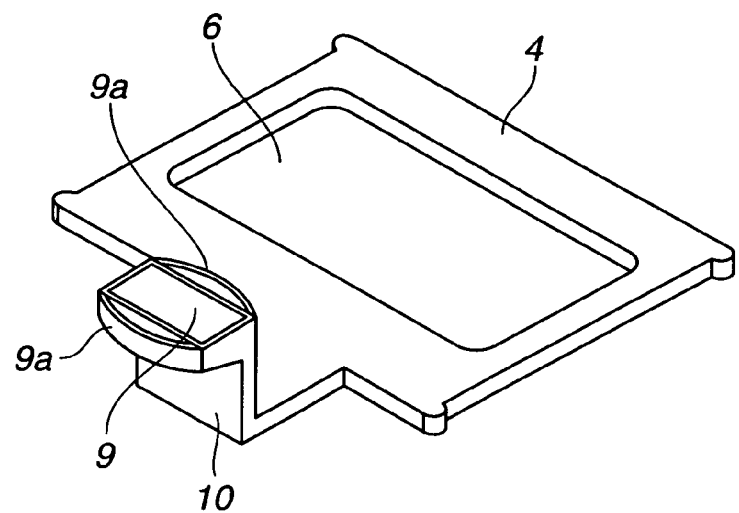
FIG. 2 is a perspective view showing a lateral slide plate of the shift lever apparatus shown in FIG. 1.

As shown in FIG. 4, the frame member 3 includes an upper plate 11 forming a top surface of frame member 3. The upper plate 11 includes a row of range indicating portions 8a, 8b, 8c and 8d having visible letters P, R, N and D, respectively, to indicate P, R, N and D ranges of the automatic mode. The upper plate 11 further includes a manual range indicating portion 8e having a visible letter M to indicate the manual mode when the shift lever 7 is inclined to the right, and shift indicating portions 8f and 8g having plus sign and minus sign to indicate upshift and downshift, respectively. The manual range indicating portion 8e is located, in the longitudinal direction, between the plus and minus shift indicating portions 8f and 8g. The upper plate 11 of frame member 3 further includes five see-through (transparent) windows 12a~12e corresponding to the five range indicating portions 8a~8e. When the shift lever 7 is put at a shift position to select one of the P, R, N, D and M ranges, the current position indicator 9 of lateral slide plate 4 is located under the see-through window for the selected range, to indicate the currently selected range. The driver can readily recognize the current range by seeing the current position indicator 9 through one of the see-through windows 12a~12e. As shown in FIG. 2, in addition to the current position indicator 9, the lateral slide plate 4 includes an approximately rectangular plate section formed with the second opening 6, and an L-shaped connecting portion 10 projecting from one lateral side (left side in this example) of the rectangular plate section, to the current position indicator 9. In this example, the rectangular plate section, connecting portion 10 and current position indicator 9 are integral parts of a single member. The top surface of current position indicator 9 is colored in red to improve the visibility.

The slide stroke of longitudinal slide plate 2 is sufficiently longer than the shift stroke of shift lever 7 in the longitudinal direction. Accordingly, at each of the front and rear end positions in the longitudinal direction, the longitudinal slide plate 2 does not abut on another member when the shift lever 7 is moved in the longitudinal direction. The slide stroke of the rectangular plate section of lateral slide plate 4 in the lateral direction is sufficiently longer than the shift stroke of shift lever 7 in the lateral direction. Accordingly, at each of the left and right end positions in the lateral direction, the rectangular plate section of lateral slide plate 4 does not abut on another member when the shift lever 7 is moved in the lateral direction. On the other hand, the slide stroke of the current position indicator 9 in the lateral direction is shorter as compared to the shift stroke of shift lever 7 in the lateral direction. Therefore, the current position indicator 9 of lateral slide plate 4 abuts against the first guide wall 13a or the guide wall 14a and produces collision noise when the shift lever 7 is inclined in a first lateral (rightward) direction from the automatic operation region 5a to the manual operation region 5b or in a second lateral (leftward) direction from the manual operation region 5b to the automatic operation region 5a. To mitigate shock in such a collision of the current position indicator 9, the lateral slide plate 4 is formed with at least one buffer portion 9a. In the example shown in FIGS. 1~4, first and second (left and right) buffer portions 9a are formed, respectively, in the left and right sides of current position indicator 9. In this example, the first and second buffer portions 9a are in the form of an arched portion formed integrally in the current position indicator 9. This integral structure can reduce the number of required parts and hence the cost of manufacturing. The first arched portion 9a on the first (left) side abuts on the first guide wall 13a of frame member 3, and thereby absorb impact in a collision. The second arched portion 9a on the second (right) side abuts on the guide wall 14a of frame member 3, and thereby absorb impact in a collision. In this example, each arched portion 9a is in the form of a curved plate curved like an arc of a circle so as to define a hollow circular segment between the flat side wall of the current position indicator 9 extending in the longitudinal direction like a chord of the circle and the arched portion curved like the arc of the circle.

FIGS. 3 and 4 illustrate operations of the range position indicating mechanism shown in FIGS. 1 and 2. The shift lever 7 can be operated in the longitudinal direction in the automatic mode when the shift lever 7 is inclined to the left and put the shift lever 7 in the automatic operation region 5a of the first opening 5 of longitudinal slide plate 2. When the shift lever is inclined to the left, the current position indicator 9 moves to the left together with the lateral slide plate 4, and indicates the ranges in the automatic mode. The longitudinal slide plate 2 and lateral slide plate 4 slide in the longitudinal direction together with the shift lever 7. At the same time, the current position indicator 9 integral with the lateral slide plate 4 moves in the guide groove 13, and displays the red top surface through one of the see-through windows 12a~12d to indicate one of the P, R, N and D ranges at a selected shift position.

In D range, the shift mode can be changed from the automatic mode to the manual mode by inclining the shift lever 7 in D range to the right, and thereby shifting the shift lever 7 from the automatic operation region 5a to the manual operation region 5b. During this rightward shift, the shift lever 7 pushes the lateral slide plate 4 rightwards, and the lateral slide plate 4 slides in the rightward direction. Therefore, the current position indicator 9 moves from the D range position in the longitudinal groove 13, into the lateral guide recess 14, and makes visible the red top surface through the see-through window 12e to indicate the M range. When, in the M range, the shift lever 7 is shifted forwards or rearwards in the longitudinal direction, the reduction ratio or transmission or gear ratio is increased or decreased by one step from the then-existing value of the reduction ratio in D range. The manual operation region 5b of first opening 5 and the second opening 6 are both elongated in the longitudinal direction to allow longitudinal movement of shift lever 7. Therefore, the longitudinal slide plate 2 and lateral slide plate 4 remain stationary without sliding in the longitudinal direction, so that the current position indicator 9 remains at the position under the see-through window 12e. Thus, in M range, the current position indicator 9 is held immovable in the longitudinal direction. In M range, the driver can recognize the current reduction ratio from the position of shift lever 7.

When the shift lever 7 is inclined to the left or right, and hence the lateral slide plate 4 slides to the left or right, the current position indicator 9 of lateral slide plate 4 abuts against the first guide wall 13a or the guide plate 14a through one of the arched portions 9a. Therefore, the arched portions 9a absorb shock in collision between the current position indicator 9 and the guide wall 13a or 14a, and thereby reduce the flapping noises. By so doing, the shift lever apparatus according to the first embodiment can improve the shift feeling in the left and right directions.

Figure 5:
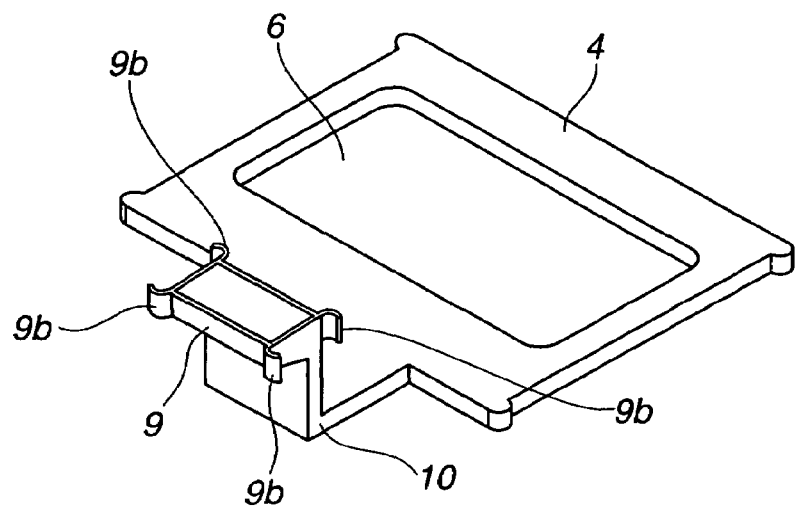
FIG. 5 is a perspective view showing a lateral slide plate of a shift lever apparatus according to a second embodiment of the present invention.
Figure 6:
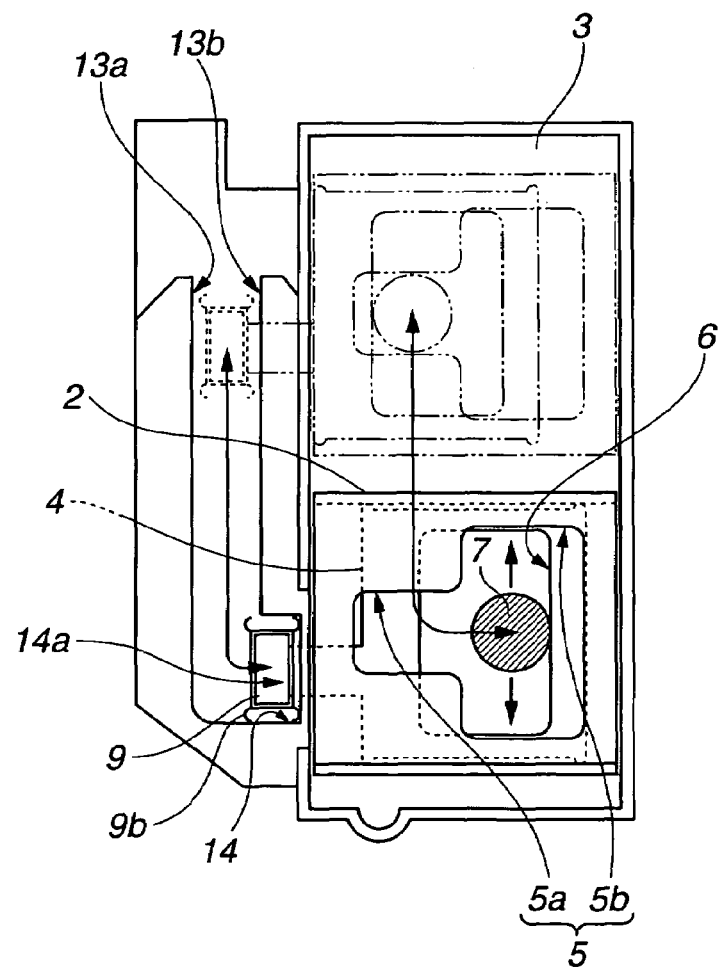
FIG. 6 is a view for illustrating operation of the shift lever apparatus according to the second embodiment.

FIGS. 5 and 6 show a shift lever apparatus according to a second embodiment of the present invention. In the second embodiment, too, there is provided at least one buffer portion on either or both of the left and right sides of the current position indicator or indicating section 9. Unlike the buffer portion of the first embodiment, the buffer portion includes one or more resilient portions 9b. In the example shown in FIG. 5, the current position indicator 9 includes four resilient portions or curved protrusions 9b projecting, respectively, from the four corners of the rectangular current position indicator 9 like a curved lip. Each resilient portion 9b is curved like the shape of a letter J so as to absorb shock in a collision with the guide wall 13a or 14a. These resilient portions 9b of this example are formed integrally in the current position indicator 9. On each of the left and right sides of current position indicator 9, two of the resilient portions 9b project laterally, respectively, from the front and rear ends of a flat side surface of the current position indicator 9.

As shown in FIG. 6, the current position indicator 9 abuts against the guide wall 13a or 14a through the two resilient portions 9a on one lateral side of current position indicator 9. Therefore, the resilient portions 9b absorb shock in a collision and mitigate the shock. In the other points, the shift lever apparatus according to the second embodiment is substantially identical to the shift lever apparatus of the first embodiment in construction and operation.

Figure 7:
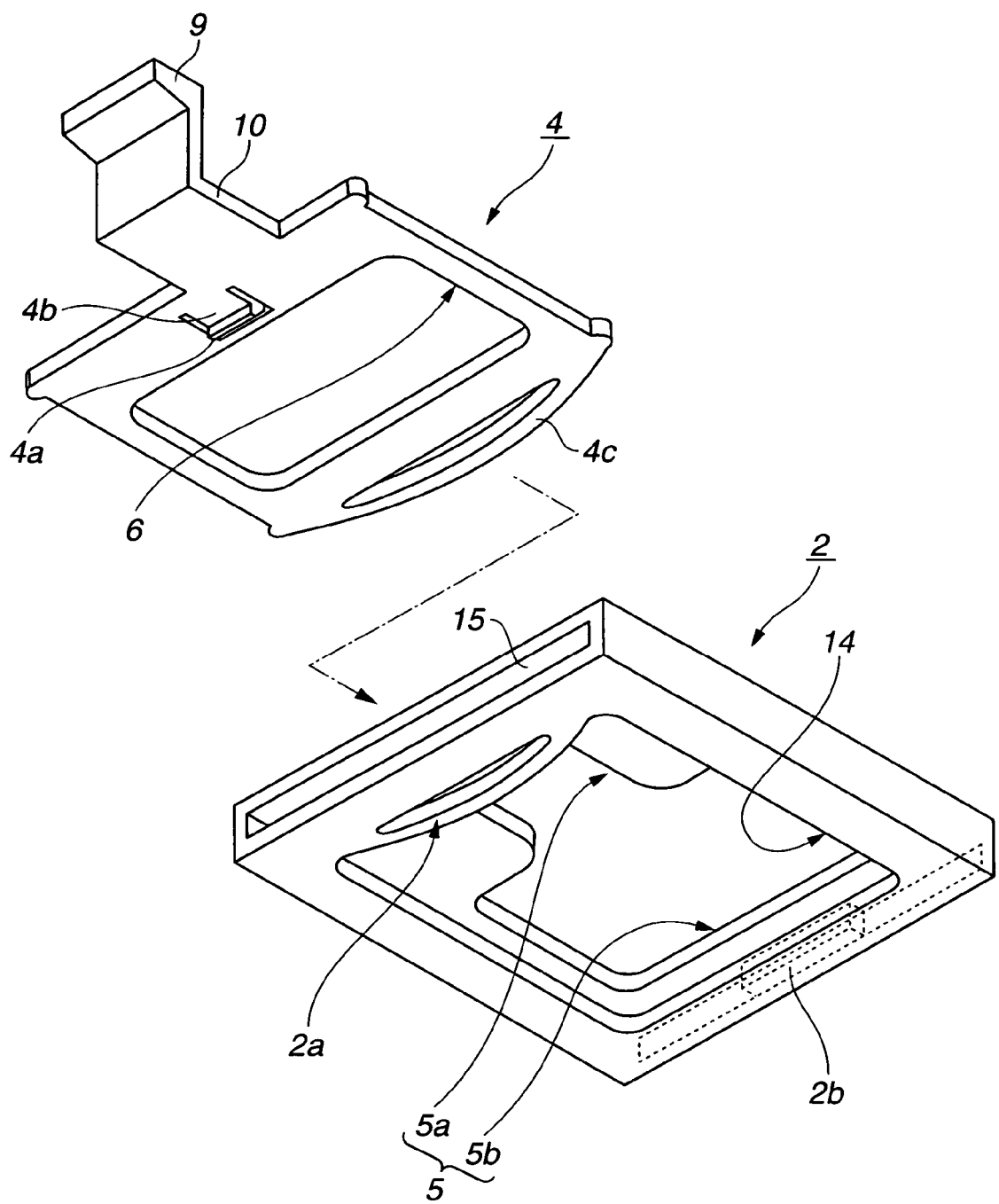
FIG. 7 is a perspective view showing a lateral slide plate and a longitudinal slide plate of a shift lever apparatus according to a third embodiment of the present invention.

FIG. 7 shows the longitudinal slide plate 2 and lateral slide plate 4 employed in a shift lever apparatus according to a third embodiment of the present invention. In the third embodiment, the shift lever apparatus has at least one pair of a buffer portion and an abutting portion, one of the buffer portion and abutting portion being formed in the lateral slide plate 4, and the other being formed in the longitudinal slide plate 2.

The longitudinal slide plate 2 is shaped like a thin box of a rectangular parallelepiped, and formed with a slit 15 through which the rectangular plate section of the lateral slide plate 4 can be inserted into the longitudinal slide plate 2. The upper wall of longitudinal slide plate 2 is formed with the first opening 5 composed of the automatic operation region 5a and manual operation region 5b, and the lower wall is formed with an approximately square third opening 14. The rectangular plate section of lateral slide plate 4 is formed with the rectangular second opening 6. The lateral side plate 4 further includes an L-shaped connecting portion 10 projecting from one lateral side (left side in this example) of the rectangular plate section, and the current position indicator 9 connected with the rectangular plate section by the L-shaped connecting portion 10. In this example, the current position indicator 9, connecting portion 10 and rectangular plate sections are integral parts of the single lateral slide plate 4.

The lateral slide plate 4 is inserted through the slit 15 into the inside cavity of longitudinal slide plate 2 and supported slidably in the longitudinal slide plate 2 so that the lateral slide plate 4 can slide in the lateral direction in the longitudinal slide plate 2. In the example of FIG. 7, the longitudinal slide plate 2 and lateral slide plate 4 are formed, respectively, with a buffer portion 2a and an abutting portion 4a designed to mitigate shock in a collision of the lateral slide plate 4 against the longitudinal slide plate 2 when the lateral slide plate 4 slides in one lateral direction (the leftward direction in this example). The buffer portion 2a is in the form of an arched portion formed in the lower wall of the longitudinal slide plate 2, so as to bulge into the approximately square third opening 14 from one lateral side (the left side) to the other lateral side (the right side). The abutting portion 4a is in the form of a raised portion projecting downward from the lower surface of the rectangular plate section of the lateral slide plate 4 on one lateral side (left side) of the second opening 6. The raised portion 4a is formed, at the middle in the length of the second opening 6 in the longitudinal direction, through an extending portion 4b extending rightwards. When the lateral slide plate 4 is shifted in the leftward direction relative to the longitudinal slide plate 2, the raised portion 4a of the lateral slide plate 4 abuts on the arched portion 2a of the longitudinal slide plate 2 and thereby absorb shock in a collision between the lateral and longitudinal slide plates 2 and 4.

In the example of FIG. 7, the longitudinal slide plate 2 and lateral slide plate 4 are further formed, respectively, with an abutting portion 2b and a buffer portion 4c designed to mitigate shock in a collision of the lateral slide plate 4 against the longitudinal slide plate 2 when the lateral slide plate 4 slides in the other lateral direction (the rightward direction in this example). The buffer portion 4c is in the form of an arched portion bulging outward from the right side of the lateral slide plate 4. The abutting portion 2b is in the form of a raised portion projecting leftwards from the middle of the right side wall of the longitudinal slide plate 2 in the inside cavity. When the lateral slide plate 4 is shifted in the rightward direction relative to the longitudinal slide plate 2, the arched portion 4c of the lateral slide plate 4 abuts on the raised portion 2b of the longitudinal slide plate 2 and thereby absorb shock in a collision between the lateral and longitudinal slide plates 2 and 4.

In this way, the raised portion 4a of the lateral slide plate 4 and the arched portion 2a of the longitudinal slide plate 2 are arranged to abut against each other and thereby absorb shock in a collision between the lateral and longitudinal slide plates 2 and 4 when the lateral slide plate 4 is shifted in one lateral direction (the leftward direction) relative to the longitudinal slide plate 2. The arched portion 4c of the lateral slide plate 4 and the raised portion 2b of the longitudinal slide plate 2 are arranged to abut against each other and thereby to absorb shock in a collision between the lateral and longitudinal slide plates 2 and 4 when the lateral slide plate 4 is shifted in the other lateral direction (the rightward direction) relative to the longitudinal slide plate 2. Therefore, the shift feeling of the shift lever in the lateral (left and right) direction is improved. In this embodiment, the lateral slide plate 4 abuts against the longitudinal slide plate 2 before the lateral slide plate 4 abuts against the guide wall 13a or 14a of the frame member 3 in each of the leftward and rightward shift operations. Therefore, the buffer portion 2*a* and 4*c* can mitigate impact in collision together with the abutting portions 4*a* and 2*b*.

In the first and second embodiments, at least one buffer portion is formed in the current position indicator to mitigate shock in collision of the lateral slide plate against the frame member. However, it is optional to form at least one buffer portion on either or both of the left and right sides of the lateral slide plate 4 so that the buffer portion abuts against the frame member 3 and thereby mitigates shock in collision between the lateral slide plate and the frame member.

This application is based on a prior Japanese Patent Application No. 2005-248525 filed on Aug. 30, 2005. The entire contents of this Japanese Patent Application No. 2005-248525 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A shift lever apparatus comprising:
   a shift lever adapted to be shifted in a longitudinal direction to select one of ranges in an automatic mode and to be inclined in a lateral direction to select a range in a manual mode;
   a frame member including a guide groove, and a set of range indicating portions indicating positions of the ranges along the guide groove;
   a longitudinal slide plate mounted on the frame member and arranged to slide in the longitudinal direction together with the shift lever; and
   a lateral slide plate mounted on the longitudinal slide plate and arranged to slide in the lateral direction relative to the longitudinal slide plate in accordance with a shift operation of the shift lever, the lateral slide plate including:
      a current shift position indicator arranged to slide in the guide groove of the frame member and to indicate a current shift position of the shift lever, and
      a buffer portion to mitigate impact at an end of a stroke of the lateral slide plate in the lateral direction;
   wherein the buffer portion of the lateral slide plate is formed in the current shift position indicator.

2. The shift lever apparatus as claimed in claim 1, wherein the frame member includes a guide wall defining the guide groove to guide movement of the current shift position indicator of the lateral slide plate, and the buffer portion of the lateral slide plate is arranged to abut on the guide wall of the frame member and to mitigate shock in a collision of the current shift position indicator against the guide wall.

3. The shift lever apparatus as claimed in claim 1, wherein the current shift position indicator of the lateral slide plate includes first and second lateral sides facing in opposite directions along the lateral direction, and each of the first and second lateral sides of the current shift position indicator is formed with the buffer portion.

4. The shift lever apparatus as claimed in claim 1, wherein the buffer portion is in the form of an arched portion forming a side surface bulging at a middle.

5. The shift lever apparatus as claimed in claim 1, wherein the buffer portion is in the form of first and second curved protrusions projecting, respectively, from first and second ends of a side surface of the current shift position indicator.

6. The shift lever apparatus as claimed in claim 1, wherein the frame member includes a guide recess recessed from the guide groove in a first lateral direction along the lateral direction, wherein the frame member is configured to receive the current shift position indicator of the lateral slide plate when the shift lever is inclined in the first lateral direction along the lateral direction from a predetermined one of the ranges of the automatic mode, to select the range of the manual mode.

7. The shift lever apparatus as claimed in claim 6, wherein the frame member includes an opening receiving the shift lever, wherein the guide recess is located, in the lateral direction, between a position of the guide groove and a position of the longitudinal slide plate.

8. The shift lever apparatus as claimed in claim 1, wherein the lateral slide plate including an opening receiving the shift lever and having a shape to allow a manual shift operation of the shift lever; and the longitudinal slide plate includes an opening including a manual operation region receiving the shift lever and having a shape to allow the manual shift operation of the shift lever, and an automatic operation region which extends continuously from the manual operation region in the lateral direction and which has a shape to allow an automatic shift operation of the shift lever.

9. A shift lever apparatus comprising:
   a shift lever adapted to be shifted in a longitudinal direction to select one of ranges in an automatic mode and to be inclined in a lateral direction to select a range in a manual mode;
   a frame member including a guide groove, and a set of range indicating portions indicating positions of the ranges along the guide groove;
   a longitudinal slide plate mounted on the frame member and arranged to slide in the longitudinal direction together with the shift lever; and
   a lateral slide plate mounted on the longitudinal slide plate and arranged to slide in the lateral direction relative to the longitudinal slide plate in accordance with a shift operation of the shift lever, the lateral slide plate including:
      a current shift position indicator arranged to slide in the guide groove of the frame member and to indicate a current shift position of the shift lever, and
      a buffer portion to mitigate impact at an end of a stroke of the lateral slide plate in the lateral direction;
   wherein the longitudinal slide plate includes an abutting portion abutting on the buffer portion of the lateral slide plate when the lateral slide plate is moved in the lateral direction relative to the longitudinal slide plate.

10. The shift lever apparatus as claimed in claim 9, wherein the lateral slide plate includes first and second lateral side portions spaced from each other in the lateral direction; the first lateral side portion of the lateral slide plate is formed with the buffer portion; the second lateral side portion of the lateral slide plate is formed with an abutting portion; the longitudinal slide plate includes first and second lateral side portions spaced from each other in the lateral direction; the first lateral side portion of the longitudinal slide plate is formed with the abutting portion adapted to abut on the buffer portion of the first lateral side portion of the lateral slide plate; and the second lateral side portion of the longitudinal slide plate is formed with a buffer portion adapted to abut on the abutting portion of the second lateral side portion of the lateral slide plate.

* * * * *